United States Patent
Huang et al.

(10) Patent No.: US 10,372,224 B2
(45) Date of Patent: Aug. 6, 2019

(54) INPUT SYSTEM

(71) Applicants: Yu-Hao Huang, Hsin-Chu (TW); Yi-Fang Lee, Hsin-Chu (TW); Ming-Tsan Kao, Hsin-Chu (TW)

(72) Inventors: Yu-Hao Huang, Hsin-Chu (TW); Yi-Fang Lee, Hsin-Chu (TW); Ming-Tsan Kao, Hsin-Chu (TW)

(73) Assignee: PIXART IMAGING INCORPORATION, R.O.C., Hsin-Chu (TW)

( * ) Notice: Subject to any disclaimer, the term of this patent is extended or adjusted under 35 U.S.C. 154(b) by 0 days.

(21) Appl. No.: 15/168,825

(22) Filed: May 31, 2016

(65) Prior Publication Data

US 2016/0274672 A1 Sep. 22, 2016

Related U.S. Application Data

(63) Continuation of application No. 13/907,182, filed on May 31, 2013, now abandoned.

(30) Foreign Application Priority Data

Jun. 20, 2012 (TW) .............................. 101121988 A

(51) Int. Cl.
*G06F 3/01* (2006.01)
*G06F 3/03* (2006.01)
*G06F 3/0484* (2013.01)

(52) U.S. Cl.
CPC ............ *G06F 3/017* (2013.01); *G06F 3/0304* (2013.01); *G06F 3/0325* (2013.01); *G06F 3/04845* (2013.01); *G06F 2203/04806* (2013.01)

(58) Field of Classification Search
CPC ......... G06F 3/0304; G06F 3/033; G06F 3/042
See application file for complete search history.

(56) References Cited

U.S. PATENT DOCUMENTS

| | | | |
|---|---|---|---|
| 8,086,971 B2 | 12/2011 | Radivojevic et al. | |
| 2004/0193413 A1* | 9/2004 | Wilson | G06F 3/017 704/243 |
| 2009/0109178 A1* | 4/2009 | Kim | H04N 5/23203 345/166 |

* cited by examiner

*Primary Examiner* — Christopher E Leiby
(74) *Attorney, Agent, or Firm* — Tung & Associates

(57) ABSTRACT

An input system includes a first gesture detection unit and a second gesture detection unit. The first gesture detection unit includes a first light emitting device for emitting a first light beam, a first light sensing device for receiving the first light beam reflected by a first motion trajectory generated by a user and outputting a first image signal, and a first processing unit for processing the first image signal and outputting a first command signal. The second gesture detection unit includes a second light emitting device for emitting a second light beam, a second light sensing device for receiving the second light beam reflected by a second motion trajectory generated by the user and outputting a second image signal, and a second processing unit for processing the second image signal and outputting a second command signal.

20 Claims, 10 Drawing Sheets

INPUT SYSTEM

CROSS REFERENCE

The present invention claims priority to TW 101121988, filed on Jun. 20, 2012. The present invention is a continuation application of U.S. Ser. No. 13/907,182, filed on May 31, 2013.

BACKGROUND OF THE INVENTION

Field of Invention

The present invention relates to an input system; particularly, it relates to such input system which is capable of detecting different gestures so as to generate a combination command.

Description of Related Art

Currently, for a user to select a function such as a phone number or a software application program on a smart phone, a handheld device or a display device, the user usually either directly touches the target icon displayed on the touch screen or selects it with an input device.

For example, keyboards, mice or touch panels are typical tools for such selections in desktop PCs or tablet PCs. Alternatively, a user may perform selections in a non-contact manner wherein the device senses gestures of upward, downward, leftward and rightward movements of a user's hand and movement of the user's hand approaching the device screen for selecting a function and confirmation.

SUMMARY OF THE INVENTION

An objective of the present invention is to provide an input system which is capable of detecting different gestures so as to generate a combination command.

Other objectives and advantages of the present invention can be understood from the disclosure of the specification.

To achieve one or more of the above and other objectives, from one perspective, the present invention provides an input system comprising a first gesture detection unit and a second gesture detection unit. The first gesture detection unit has a first sensible range and includes a first light emitting device, a first light sensing device and a first processing unit. The first light emitting device is for emitting a first light beam. The first light sensing device is for receiving the first light beam which is reflected by a first motion trajectory generated by a user and outputting a first image signal accordingly. The first processing unit is for processing the first image signal and outputting a first command signal accordingly. The second gesture detection unit has a second sensible range and includes a second light emitting device, a second light sensing device and a second processing unit. The second light emitting device is for emitting a second light beam. The second light sensing device is for receiving the second light beam which is reflected by a second motion trajectory generated by the user and outputting a second image signal accordingly. The second processing unit is for processing the second image signal and outputting a second command signal accordingly.

In one embodiment, the first command signal includes a gesture command signal or a cursor movement command signal. In one embodiment, the gesture command signal includes an upward command signal, a downward command signal, a leftward command signal, a rightward command signal, a clockwise command signal, a counterclockwise command signal, a push forward command signal, a pull backward command signal, or a waving-hand command signal. In one embodiment, the cursor movement command signal includes a cursor motion signal or an object motion signal.

In one embodiment, the second command signal includes a gesture command signal or a cursor movement command signal. In one embodiment, the gesture command signal includes an upward command signal, a downward command signal, a leftward command signal, a rightward command signal, a clockwise command signal, a counterclockwise command signal, a push forward command signal, a pull backward command signal, or a waving-hand command signal. In one embodiment, the cursor movement command signal includes a cursor motion signal or an object motion signal.

In one embodiment, the input system is for transmitting the first command signal and the second command signal to an electronic device in serial or parallel manner so that the electronic device generates a corresponding action. In one embodiment, the action includes a copy, paste, zoom-in, zoom-out or object dragging action.

In one embodiment, the first light beam and the second light beam are invisible light beams.

In one embodiment, the first light beam and the second light beam have the same wavelength range. In one embodiment, the first sensible range and the second sensible range do not overlap with each other.

In one embodiment, the first light beam and the second light beam have different wavelength ranges. In one embodiment, the first sensible range and the second sensible range partially overlap with each other.

From another perspective, the present invention provides an input system comprising a light emitting device, a first gesture detection unit and a second gesture detection unit. The light emitting device is for emitting a light beam. The first gesture detection unit has a first sensible range and includes a first light sensing device and a first processing unit. The first light sensing device is for receiving the light beam which is reflected by a first motion trajectory generated by a user and outputting a first image signal accordingly. The first processing unit is for processing the first image signal and outputting a first command signal accordingly. The second gesture detection unit has a second sensible range and includes a second light sensing device and a second processing unit. The second light sensing device is for receiving the light beam which is reflected by a second motion trajectory generated by the user and outputting a second image signal accordingly. The second processing unit is for processing the second image signal and outputting a second command signal accordingly.

In light of the above, the input system of the present invention at least has the following advantages: first, the input system can detect different gestures with the first gesture detection unit and the second gesture detection unit so as to generate a combination command. Secondly, both the first gesture detection unit and the second gesture detection unit can operate in the gesture mode and the cursor motion mode, so there are more varieties of combination commands that may be generated, and therefore the input system of the present invention is superior to and can replace the conventional input system (e.g., the mouse).

The objectives, technical details, features, and effects of the present invention will be better understood with regard to the detailed description of the embodiments below, with reference to the attached drawings.

DESCRIPTION OF THE PREFERRED EMBODIMENTS

Figure 1A:
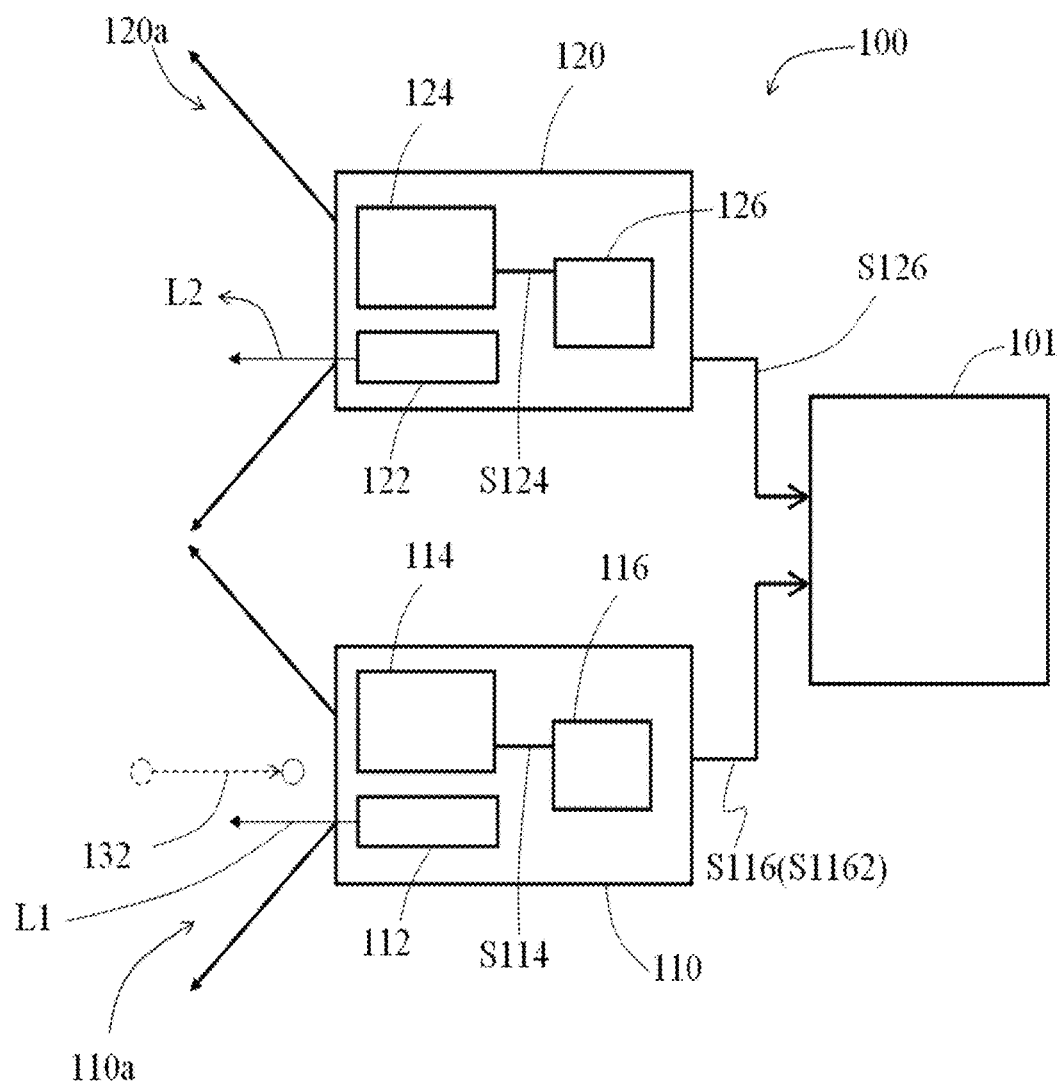
FIGS. 1A-1C are schematic diagrams showing actions by an input system to input commands to an electronic device according to an embodiment of the present invention.

The above and other technical details, features and effects of the present invention will be will be better understood with regard to the detailed description of the embodiments below, with reference to the drawings. In the description, the words relate to directions such as "upward", "downward", "leftward", "rightward", "forward", "backward", etc. are used to illustrate relative orientations in the drawings and should not be considered as limiting in any way.

Figure 1B:
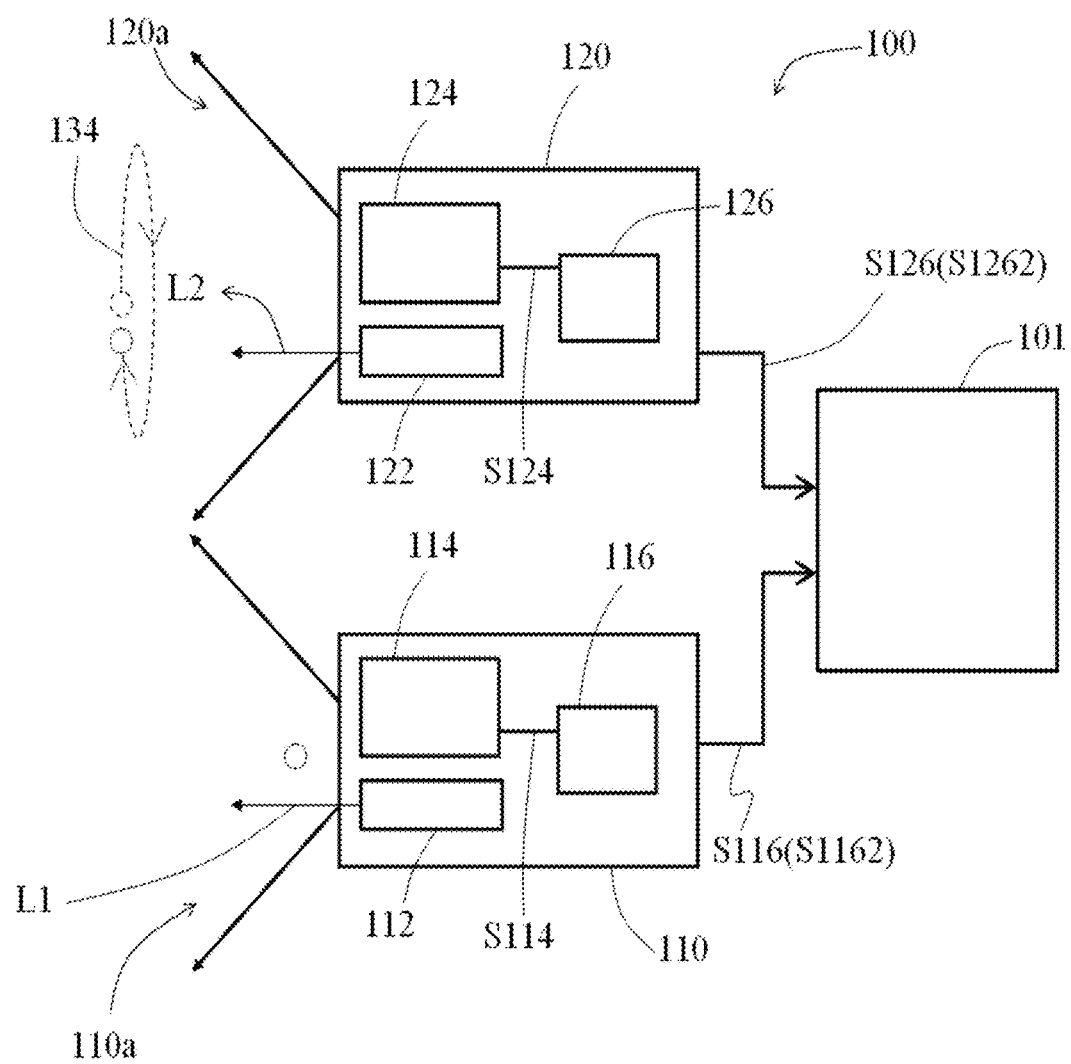
Figure 1C:
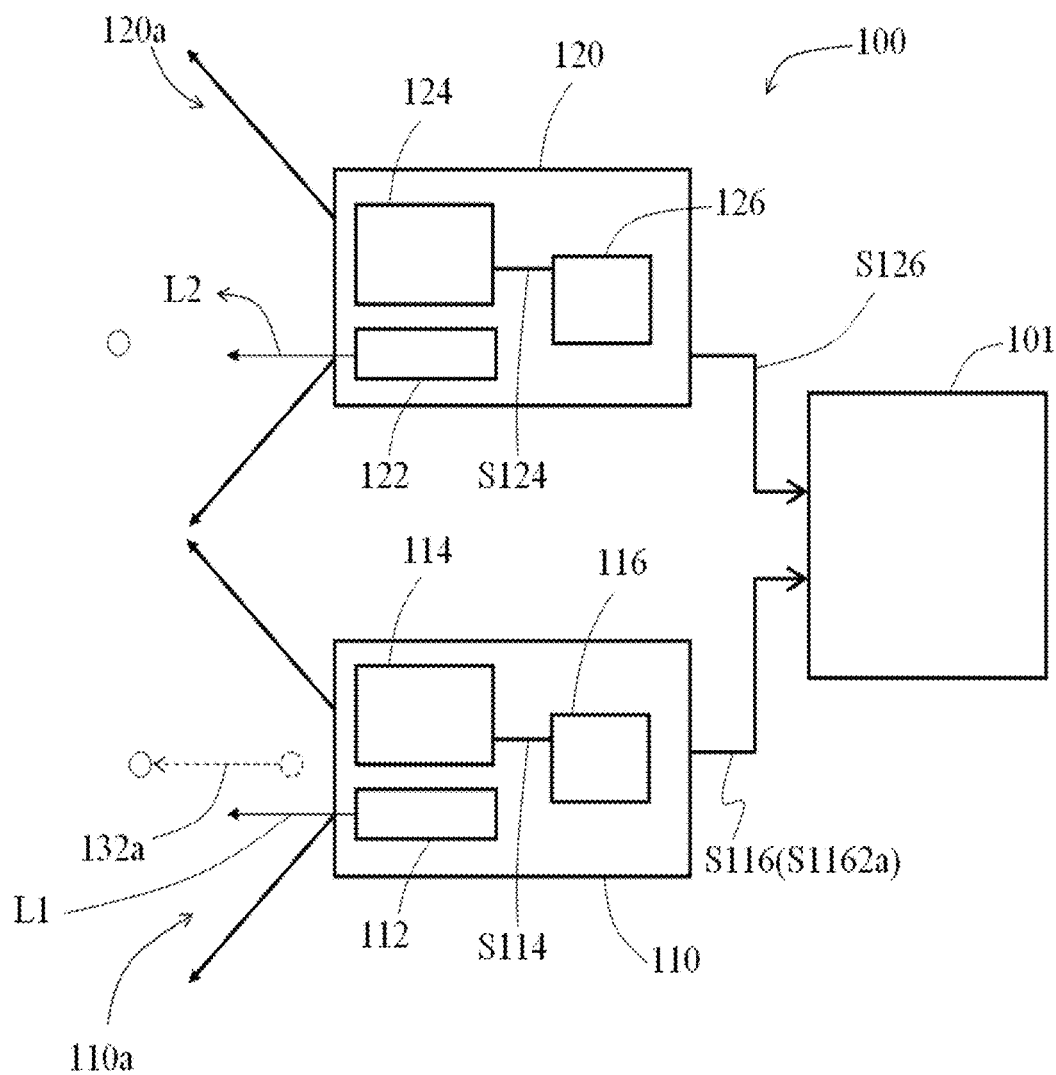

FIGS. 1A-1C are schematic diagrams showing actions by an input system to input commands to an electronic device according to an embodiment of the present invention. The input system 100 of this embodiment comprises a first gesture detection unit 110 and a second gesture detection unit 120. The first gesture detection unit 110 and the second gesture detection unit 120 detects the user's different gestures to control the corresponding operation of the electronic device 101.

For instance, when the first gesture detection unit 110 detects a gesture indicative of outputting a command of the "control" key (abbreviated as "Ctrl") and the second gesture detection unit 120 detects a gesture indicative of outputting a command of plus sign (denoted as "+") or minus sign (denoted as "−"), the two gestures are integrated to become a combination command indicative of controlling a zoom-in operation or a zoom-out operation for the screen of the electronic device 101. Or for another example, when the first gesture detection unit 110 detects a gesture indicative of outputting a command of "object selection" corresponding to left-clicking the mouse and the second gesture detection unit 120 detects a gesture indicative of moving the trajectory of an object, the two gestures are integrated to become a combination command indicative of moving the object. Or for a further example, the first gesture detection unit 110 and the second gesture detection unit 120 can be used to respectively detect the gestures of different users who are playing a game on the electronic device 101 (e.g., the double player mode). The details for how the first gesture detection unit 110 and the second gesture detection unit 120 detect the user's different gestures so as to control the corresponding operations of the electronic device 101 are explained below.

Please refer to FIG. 1A. The first gesture detection unit 110 has a first sensible range 110a and includes a first light emitting device 112, a first light sensing device 114 and a first processing unit 116. The first light emitting device 112 is for emitting a first light beam L1. The first light beam L1 is for example but not limited to infrared light, which is invisible light. The first light sensing device 114 is for receiving the first light beam L1 when it is reflected by a first motion trajectory 132 generated by the user and outputting a first image signal S114 accordingly. The first processing unit 116 is for processing the first image signal S114 and outputting a first command signal S116 accordingly.

More specifically, in response to a different first motion trajectory 132 and depending on the operation mode where the input system 100 is operated (e.g., the gesture mode or the cursor mode), the first command signal S116 for example can be a gesture command signal S1162 or a cursor movement command signal (not shown), etc. While the input system 100 is operated under the gesture mode, the gesture command signal S1162 for example is an upward command signal, a downward command signal, a leftward command signal, a rightward command signal, a clockwise command signal, a counterclockwise command signal, a push forward command signal, a pull backward command signal, or a waving-hand command signal, etc. While the input system 100 is operated under the cursor mode, the cursor movement command signal includes a cursor motion signal or an object motion signal. In the example shown in FIG. 1A, the first gesture detection unit 110 detects the gesture under the gesture mode. That is, when detecting a gesture of a pushing forward movement (as shown by the first motion trajectory 132 in FIG. 1A), the first gesture detection unit 110 outputs a corresponding push forward command signal as the gesture command signal S1162. The push forward command signal can be representing, for example, the command of the "control" key ("Ctrl") on the keyboard.

Next, please refer to FIG. 1B. The second gesture detection unit 120 has a second sensible range 120a and includes a second light emitting device 122, a second light sensing device 124 and a second processing unit 126. The second light emitting device 122 is for emitting a second light beam L2. The second light beam L2 for example is invisible light, and is infrared light having the same wavelength range as the first light beam L1 in this embodiment, but is not limited thereto. The second light sensing device 124 is for receiving the second light beam L2 which is reflected by a second motion trajectory 134 generated by the user and outputting a second image signal S124 accordingly. The second processing unit 126 is for processing the second image signal S124 and outputting a second command signal S126 accordingly. Similarly, in response to a different second motion trajectory 134 and depending on the operation mode where the input system 100 is operated (e.g., the gesture mode or the cursor mode), the second command signal S126 for example can be a gesture command signal S1262 or a cursor movement command signal (not shown), etc. While the input system 100 is operated under the gesture mode, the gesture command signal S1262 for example is an upward command signal, a downward command signal, a leftward command signal, a rightward command signal, a clockwise command signal, a counterclockwise command signal, a push forward command signal, a pull backward command signal, or a waving-hand command signal. While the input system 100 is operated under the cursor mode, the cursor movement command signal includes a cursor motion signal or an object motion signal.

Figure 2A:
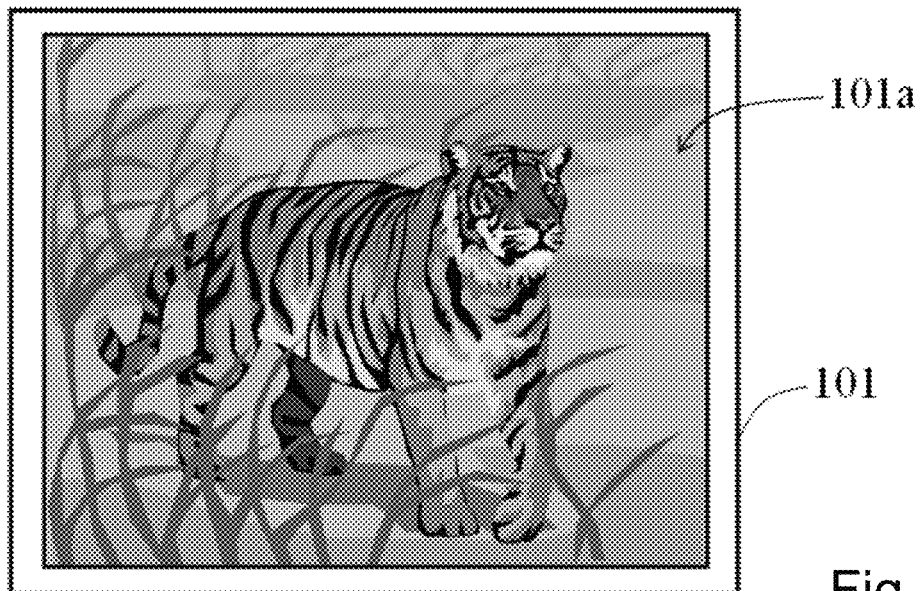
FIGS. 2A-2B illustrate that the image displayed on the screen is varied in response to a command inputted by the input system to the electronic device as shown in FIGS. 1A-1C.
Figure 2B:
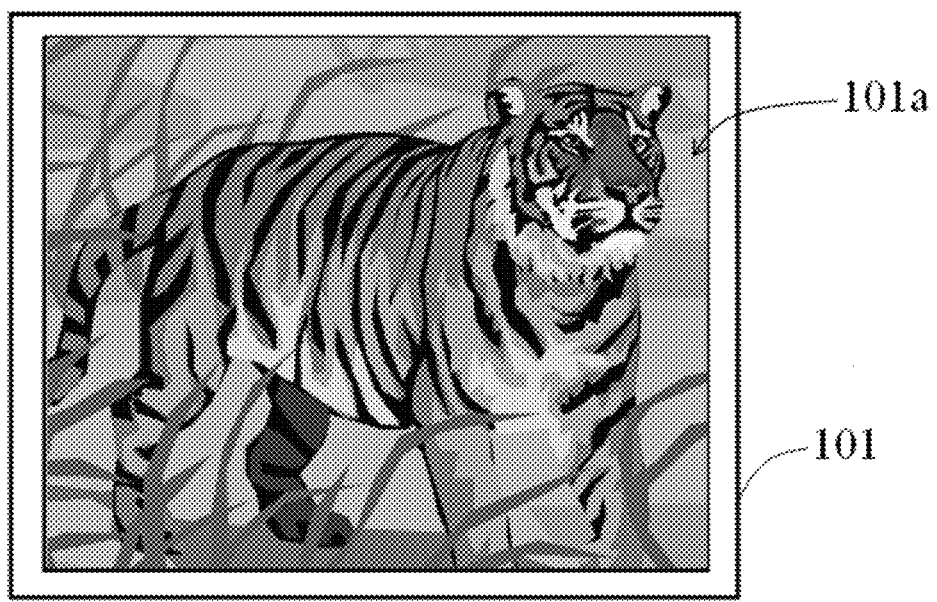

In the example shown in FIG. 1B, the second gesture detection unit 120 is also under the gesture mode. In other words, when detecting a gesture of a clockwise movement (as shown by the second motion trajectory 134 in FIG. 1B), the second gesture detection unit 120 outputs a corresponding clockwise command signal as the gesture command signal S1262. The clockwise command signal for example can be representing the command of plus sign ("+"). As a consequence, a combination command combining the command of "Ctrl" and the command of "+" is inputted to the electronic device 101 whereby the screen 101a of the electronic device 101 is zoomed in, as shown in FIGS. 2A-2B. On the other hand, when detecting a gesture of a counterclockwise movement, the second gesture detection unit 120 outputs a corresponding counterclockwise command signal as the gesture command signal S1262. The counterclockwise command signal for example can be representing the command of minus sign ("−"). As a consequence, a combination command combining the command of "Ctrl" and the command of "−" is inputted to the electronic device 101 whereby the screen 101a of the electronic device 101 is zoomed out, as shown in FIGS. 2A-2B.

If the user intends to stop the zoom-in or zoom-out operation, (i.e., to stop outputting the command of "Ctrl"), the user can move the gesture away from the first gesture detection unit 110, whereby the first gesture detection unit 110 detects a gesture of a backward movement (as shown by the first motion trajectory 132a in FIG. 1C) and outputs a corresponding pull backward command signal as the gesture command signal S1162a. The pull backward command signal for example can be representing "not outputting the Ctrl command".

In view of the above, the input system 100 of this embodiment can detect different gestures generated by the user with the first gesture detection unit 110 and the second gesture detection unit 120 under the gesture mode so as to generate a combination command (e.g., as described previously, the combination of the command "Ctrl" and the command of "+"; or, the combination of the command "Ctrl" and the command of "−"), for controlling the operation of the electronic device 101 (e.g., the zoom-in/zoom-out action). Certainly, it should be understood that the above-mentioned examples are for illustrative purpose, but not for limiting the scope of the present invention. The user can combine multiple gestures by any combinations. As another example, the user also can combine a gesture (e.g., an upward command signal, a downward command signal, a leftward command signal, a rightward command signal, a clockwise command signal, a counterclockwise command signal, a push forward command signal, a pull backward command signal, or a waving-hand command signal) with one or more hardware inputs such as a keyboard input (e.g., the "control" key, the "shift" key, the "Alt" key, the "+" key, the "−" key, the "upward arrow" key, the "downward arrow" key, the "leftward arrow" key, or the "rightward arrow" key, etc.) so as to generate other combination commands (e.g., page up, page down, scroll-up, scroll-down, copy, paste, cut, open or close, etc.), for controlling the electronic device 101. Note that the input system can transmit the first command signal and the second command signal to the electronic device in serial or parallel manner.

Figure 3A:
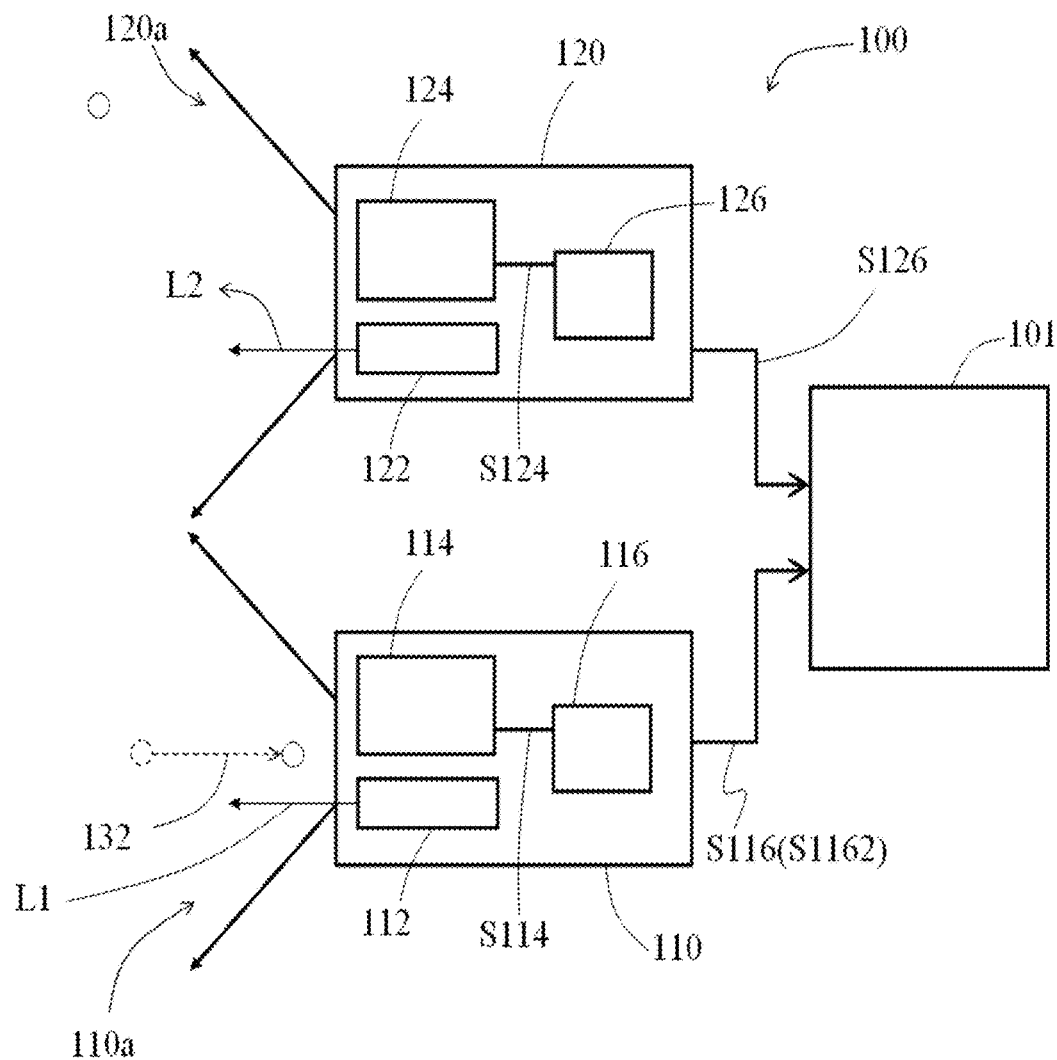
FIGS. 3A-3C are schematic diagrams showing actions by an input system to input commands to an electronic device according to another embodiment of the present invention.
Figure 3B:
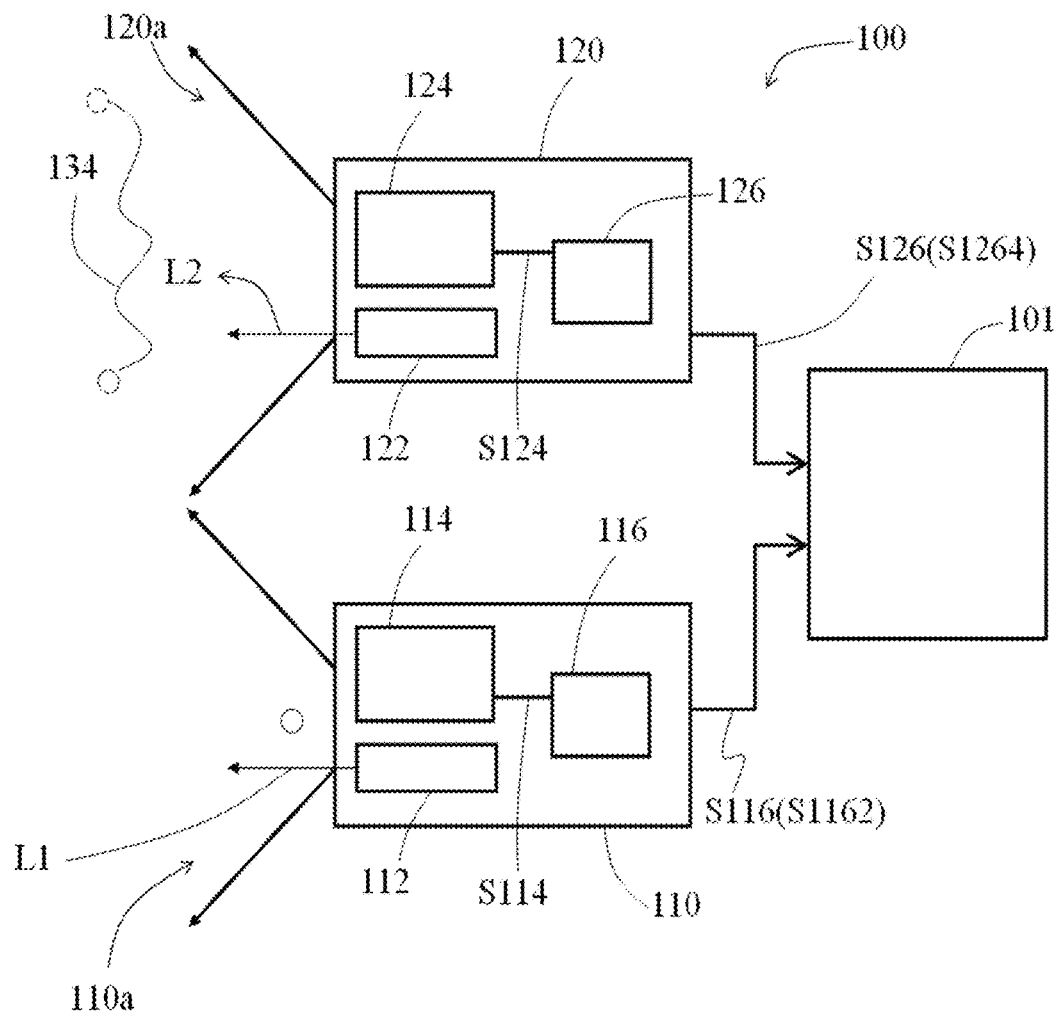
Figure 3C:
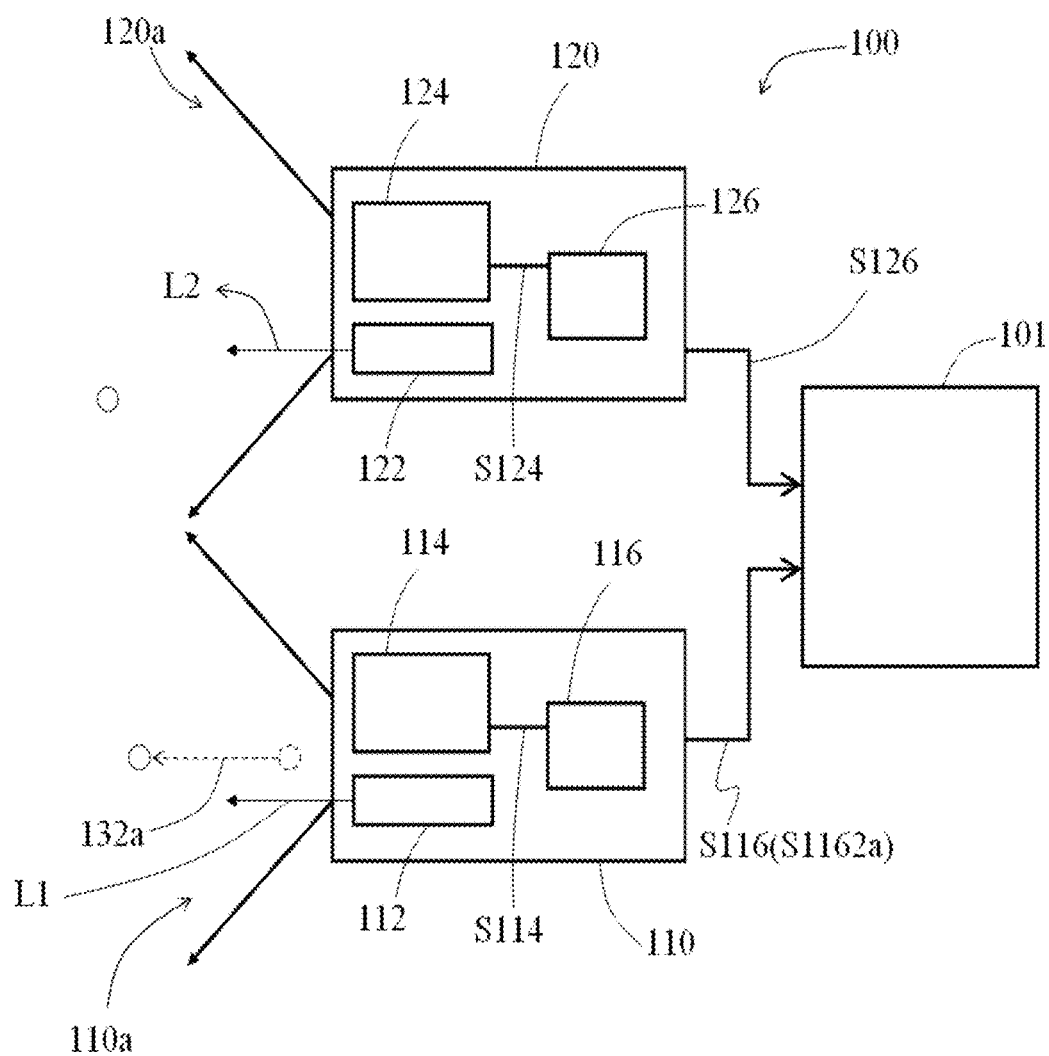

In another embodiment, the input system 100 also can detect different gestures and motion trajectories generated by the user with the first gesture detection unit 110 and the second gesture detection unit 120 under the cursor mode so as to generate a combination command, hence controlling an object motion of the electronic device 101, as shown in FIGS. 3A-3C. FIGS. 3A-3C are schematic diagrams showing actions by an input system to input commands to an electronic device according to an embodiment of the present invention.

Figure 4A:
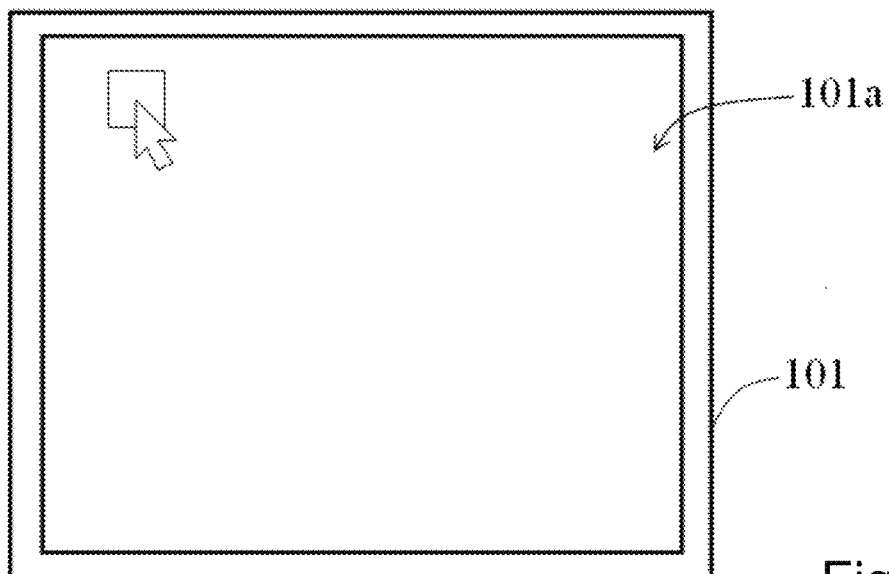
FIGS. 4A-4B illustrate that the image displayed on the screen is varied in response to a command inputted by the input system to the electronic device as shown in FIGS. 3A-3C.

In the example shown in FIG. 3A, the first gesture detection unit 110 detects the gesture under the gesture mode. That is, when detecting a gesture of pushing forward (as shown by the first motion trajectory 132 in FIG. 3A), the first gesture detection unit 110 outputs a corresponding push forward command signal as the gesture command signal S1162. The push forward command signal for example can be representing the command corresponding to the left-click on a mouse. As a result, an object on the screen 101a of the electronic device 101 is selected, as shown in FIG. 4A.

Figure 4B:
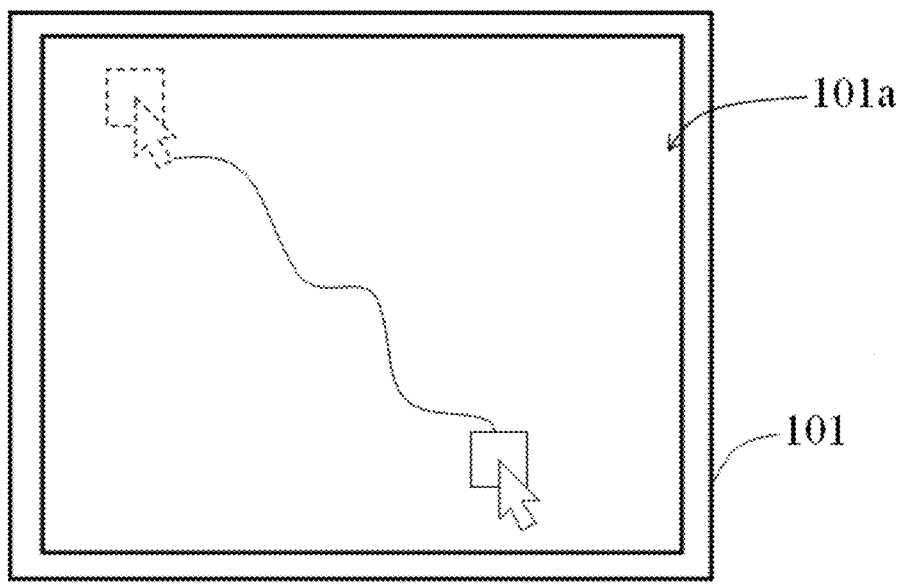

Next, the input system 100 of this embodiment detects the motion trajectory of another gesture (as shown by the motion trajectory 134 shown in FIG. 3B) by the second gesture detection unit 120. Because the second gesture detection unit 120 detects the motion trajectory of the gesture under the cursor mode, it outputs a corresponding cursor motion signal as the cursor movement command signal S1264. The cursor motion signal for example can be representing a trajectory corresponding to the motion trajectory of the gesture. Consequently, the selected object on the screen 101a of the electronic device 101 is dragged or moved to a desired position, as shown in FIG. 4B.

If the user intends to stop moving the object (i.e., stop outputting the left-click command), the user can move the gesture away from the first gesture detection unit 110, whereby the first gesture detection unit 110 detects a gesture of pulling backward (as shown by the first motion trajectory 132a in FIG. 3C) and outputs a corresponding pull backward command signal as the gesture command signal S1162a. The pull backward command signal for example can be representing "not outputting the left-click command".

In view of the above, the input system 100 of this embodiment can detect a gesture of the user by the first gesture detection unit 110 under the gesture mode and detect the motion trajectory of another gesture of the user by the second gesture detection unit 120 under the cursor mode to generate a combination command, for controlling the object motion operation of the electronic device 101. Certainly, it should be understood that the above-mentioned examples are for illustrative purpose, but not for limiting the scope of the present invention. The user can combine multiple gestures by any combinations. As another example, the user also can combine a gesture (e.g., an upward command signal, a downward command signal, a leftward command signal, a rightward command signal, a clockwise command signal, a counterclockwise command signal, a push forward command signal, a pull backward command signal, or a waving-hand command signal) with one or more hardware inputs such as a keyboard input (e.g., the "control" key, the "shift" key, the "Alt" key, the "+" key, the "−" key, the "upward arrow" key, the "downward arrow" key, the "leftward arrow" key, or the "rightward arrow" key, etc.) so as to generate other combination commands (e.g., page up, page down, scroll-up, scroll-down, copy, paste, cut, open or close, etc.), for controlling the electronic device 101.

In another embodiment, the first gesture detection unit 110 and the second gesture detection unit 120 can concurrently detect different gestures generated by the same user or different users under the cursor mode, for example in a game, hence making the game more entertaining. For example, in a game which is originally for one player, if the first gesture detection unit 110 and the second gesture detection unit 120 are concurrently operated under the cursor mode, another player is allowed to join the game, thus making the game more amusing by multiplayers' interactions.

It is noteworthy that, in case the above-mentioned first light beam L1 and the above-mentioned second light beam L2 are both invisible light beams having the same wavelength range, the first sensible range 110a and the second sensible range 120a preferably do not overlap with each other to avoid mis-control or the mis-operation. Nevertheless, if the first light beam L1 and the second light beam L2 have different wavelength ranges, the mis-control or the misoperation will be less likely, and in this case the first sensible range 110*a* and the second sensible range 120*a* may overlap with each other.

Figure 5:
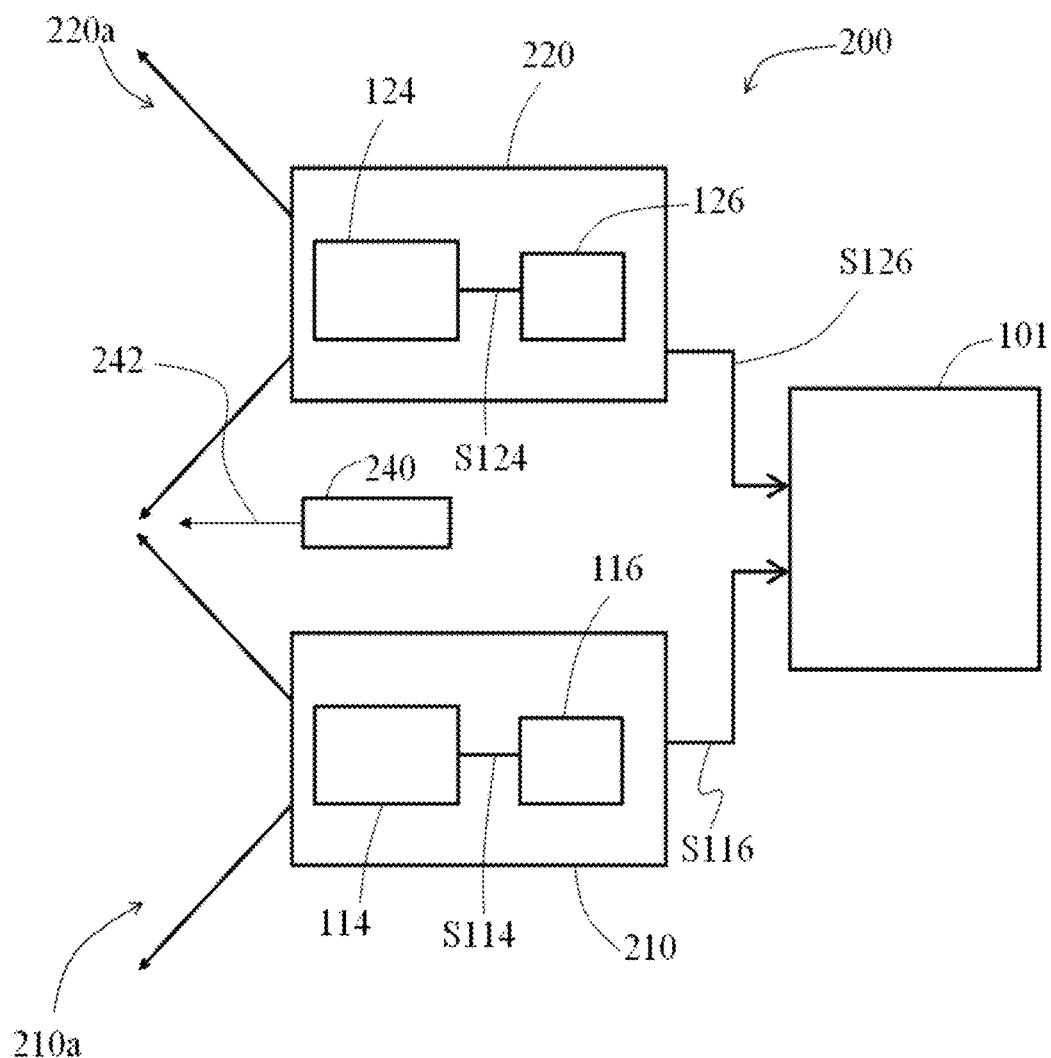
FIG. 5 illustrates an input system according to yet another embodiment of the present invention.

FIG. 5 illustrates an input system according to yet another embodiment of the present invention. Please refer to both FIG. 1A and FIG. 5. The input system 200 of this embodiment is substantially the same as the above-mentioned input system 100, but is different in that the input system 200 of this embodiment includes only one single light emitting device 240, and the first gesture detection unit 210 and the second gesture detection unit 220 do not include the above-mentioned first light emitting device 112 and second light emitting device 122, respectively. That is, both the first gesture detection unit 210 and the second gesture detection unit 220 detect the light beam 242 emitted from the same single light emitting device 240.

Because the first gesture detection unit 210 and the second gesture detection unit 220 both detect the light beam 242 emitted from the same light emitting device 240, the first sensible range 110*a* and the second sensible range 120*a* preferably do not overlap with each other. Besides the difference that the first gesture detection unit 210 and the second gesture detection unit 220 do not include the light emitting devices, the input system 200 of this embodiment has substantially the same advantages and efficacies as the above-mentioned input system 100, which are not redundantly repeated here.

Figure 6:
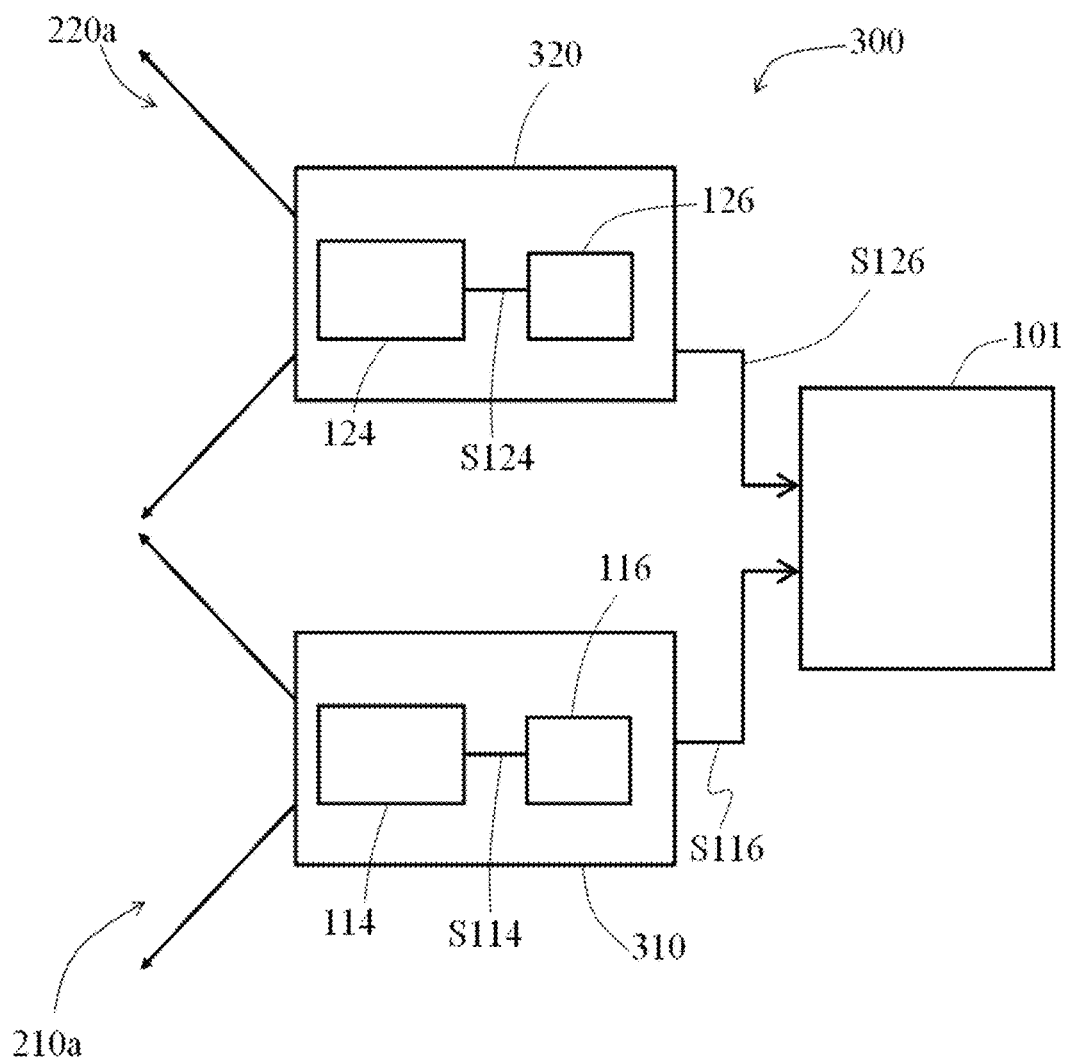
FIG. 6 illustrates an input system according to still another embodiment of the present invention.

FIG. 6 illustrates an input system according to still another embodiment of the present invention. Please refer to both FIG. 1A and FIG. 6. The input system 300 of this embodiment is substantially the same as the above-mentioned input system 100, but is different in that the input system 300 of this embodiment does not include any light emitting device. That is, the first gesture detection unit 310 and the second gesture detection unit 320 of the input system 300 do not include the above-mentioned first light emitting device 112 and second light emitting device 122, respectively. In other words, both the first gesture detection unit 210 and the second gesture detection unit 220 detect visible light provided from the environment.

Besides the difference that the input system 300 of this embodiment detects visible light whereas the above-mentioned input system 100 detects the invisible light, the input system 300 of this embodiment has substantially the same advantages and efficacies as the above-mentioned input system 100, which are not redundantly repeated here.

In light of the above, the input system of the present invention at least has the following advantages: first, the input system can detect different gestures with the first gesture detection unit and the second gesture detection unit so as to generate a combination command. Secondly, both the first gesture detection unit and the second gesture detection unit can operate in the gesture mode and the cursor motion mode, so there are more varieties of combination commands that may be generated, and therefore the input system of the present invention is superior to and can replace the conventional input system (e.g., the mouse).

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. In view of the foregoing, the spirit of the present invention should cover all such and other modifications and variations, which should be interpreted to fall within the scope of the following claims and their equivalents.

What is claimed is:

1. An input system, comprising:
   a first gesture detection unit having a first sensible range, wherein the first gesture detection unit includes:
   a first light emitting device for emitting a first light beam;
   a first light sensing device for receiving the first light beam which is reflected by a first motion trajectory generated by a user and outputting a first image signal accordingly;
   a first processing unit for processing the first image signal and outputting a first command signal accordingly;
   a second gesture detection unit having a second sensible range, wherein the second gesture detection unit includes:
   a second light emitting device for emitting a second light beam;
   a second light sensing device for receiving the second light beam which is reflected by a second motion trajectory generated by the user and outputting a second image signal accordingly; and
   a second processing unit for processing the second image signal and outputting a second command signal accordingly;
   wherein the input system is for transmitting the first command signal and the second command signal to an electronic device and wherein the first and second command signals outputted by the first and second gesture detection units according to two gestures performed together at the same time are integrated to become a combination command, so that the electronic device generates a corresponding combination action according to the combination command, wherein the combination action is different from separately generating two actions in correspondence with the first command signal and the second command signal;
   wherein the first gesture detection unit and the second gesture detection unit are two respective gesture detection units; the first light emitting device and the second light emitting device are two respective light emitting devices; the first light sensing device and the second light sensing device are two respective light sensing devices, the first light sensing device sensing the first light beam irrespective of the second light emitting device and the second light beam, and the second light sensing device sensing the second light beam irrespective of the first light emitting device and the first light beam; and the first processing unit and the second processing unit are two respective processing units, the first processing unit processing the first image signal irrespective of the second processing unit and the second image signal, and the second processing unit processing the second image signal irrespective of the first processing unit and the first image signal, whereby the first gesture detection unit outputs the first command signal independently, irrespective of the second gesture detection unit, the second light emitting device, and the second light sensing device, and the second gesture detection unit outputs the second command signal independently, irrespective of the first gesture detection unit, the first light emitting device, and the first light sensing device.

2. The input system of claim 1, wherein the first command signal includes a gesture command signal or a cursor movement command signal.

3. The input system of claim 2, wherein the gesture command signal includes an upward command signal, a downward command signal, a leftward command signal, a rightward command signal, a clockwise command signal, a counterclockwise command signal, a push forward command signal, a pull backward command signal, or a waving-hand command signal.

4. The input system of claim 2, wherein the cursor movement command signal includes a cursor motion signal or an object motion signal.

5. The input system of claim 1, wherein the second command signal includes a gesture command signal or a cursor movement command signal.

6. The input system of claim 5, wherein the gesture command signal includes an upward command signal, a downward command signal, a leftward command signal, a rightward command signal, a clockwise command signal, a counterclockwise command signal, a push forward command signal, a pull backward command signal, or a waving-hand command signal.

7. The input system of claim 5, wherein the cursor movement command signal includes a cursor motion signal or an object motion signal.

8. The input system of claim 1, wherein the combination action includes a copy, paste, zoom-in, zoom-out or object dragging action.

9. The input system of claim 1, wherein the first light beam and the second light beam are invisible light beams.

10. The input system of claim 9, wherein the first light beam and the second light beam have a same wavelength range.

11. The input system of claim 10, wherein the first sensible range and the second sensible range do not overlap with each other.

12. The input system of claim 9, wherein the first light beam and the second light beam have different wavelength ranges.

13. The input system of claim 12, wherein the first sensible range and the second sensible range partially overlap with each other.

14. An input system, comprising:
a light emitting device for emitting a light beam;
a first gesture detection unit having a first sensible range, wherein the first gesture detection unit includes:
  a first light sensing device for receiving the light beam which is reflected by a first motion trajectory generated by a user and outputting a first image signal accordingly;
  a first processing unit for processing the first image signal and outputting a first command signal accordingly;
a second gesture detection unit having a second sensible range, wherein the second gesture detection unit includes:
  a second light sensing device for receiving the light beam which is reflected by a second motion trajectory generated by the user and outputting a second image signal accordingly; and
  a second processing unit for processing the second image signal and outputting a second command signal accordingly;
wherein the input system is for transmitting the first command signal and the second command signal to an electronic device and wherein the first and second command signals outputted by the first and second gesture detection units according to two gestures performed together at the same time are integrated to become a combination command, so that the electronic device generates a corresponding combination action according to the combination command, wherein the combination action is different from separately generating two actions in correspondence with the first command signal and the second command signal;
wherein the first gesture detection unit and the second gesture detection unit are two respective gesture detection units; the first light sensing device and the second light sensing device are two respective light sensing devices, the first light sensing device sensing the first light beam irrespective of the second light emitting device and the second light beam, and the second light sensing device sensing the second light beam irrespective of the first light emitting device and the first light beam; and the first processing unit and the second processing unit are two respective processing units, the first processing unit processing the first image signal irrespective of the second processing unit and the second image signal, and the second processing unit processing the second image signal irrespective of the first processing unit and the first image signal, whereby the first gesture detection unit outputs the first command signal independently, irrespective of the second gesture detection unit, the second light emitting device, and the second light sensing device, and the second gesture detection unit outputs the second command signal independently, irrespective of the first gesture detection unit, the first light emitting device, and the first light sensing device.

15. The input system of claim 14, wherein the first command signal includes a gesture command signal or a cursor movement command signal.

16. The input system of claim 15, wherein:
the gesture command signal includes an upward command signal, a downward command signal, a leftward command signal, a rightward command signal, a clockwise command signal, a counterclockwise command signal, a push forward command signal, a pull backward command signal, or a waving-hand command signal; or
the cursor movement command signal includes a cursor motion signal or an object motion signal.

17. The input system of claim 15, wherein the cursor movement command signal includes a cursor motion signal or an object motion signal.

18. The input system of claim 14, wherein the second command signal includes a gesture command signal or a cursor movement command signal.

19. The input system of claim 18, wherein:
the gesture command signal includes an upward command signal, a downward command signal, a leftward command signal, a rightward command signal, a clockwise command signal, a counterclockwise command signal, a push forward command signal, a pull backward command signal, or a waving-hand command signal; or the cursor movement command signal includes a cursor motion signal or an object motion signal.

20. An input system, comprising:

a first gesture detection unit having a first sensible range, wherein the first gesture detection unit includes:
  a first light emitting device for emitting a first light beam;
  a first light sensing device for receiving the first light beam which is reflected by a first motion trajectory generated by a user and outputting a first image signal; and
  a first processing unit for processing the first image signal and outputting a first command signal;

a second gesture detection unit having a second sensible range not overlapped with the first sensible range, wherein the second gesture detection unit includes:
  a second light emitting device for emitting a second light beam;
  a second light sensing device for receiving the second light beam which is reflected by a second motion trajectory generated by the user and outputting a second image signal; and
  a second processing unit for processing the second image signal and outputting a second command signal;

wherein the first motion trajectory and the second motion trajectory are generated by the user concurrently, and the first command signal and the second command signal outputted by the first and second gesture detection units are combined to generate a combination action which is different from separately generating two actions in correspondence with the first command signal and the second command signal;

wherein the first gesture detection unit and the second gesture detection unit are two respective gesture detection units; the first light emitting device and the second light emitting device are two respective light emitting devices; the first light sensing device and the second light sensing device are two respective light sensing devices, the first light sensing device sensing the first light beam irrespective of the second light emitting device and the second light beam, and the second light sensing device sensing the second light beam irrespective of the first light emitting device and the first light beam; and the first processing unit and the second processing unit are two respective processing units, the first processing unit processing the first image signal irrespective of the second processing unit and the second image signal, and the second processing unit processing the second image signal irrespective of the first processing unit and the first image signal, whereby the first gesture detection unit outputs the first command signal independently, irrespective of the second gesture detection unit, the second light emitting device, and the second light sensing device, and the second gesture detection unit outputs the second command signal independently, irrespective of the first gesture detection unit, the first light emitting device, and the first light sensing device.

* * * * *